(12) United States Patent
Evans

(10) Patent No.: US 9,603,426 B2
(45) Date of Patent: *Mar. 28, 2017

(54) APPARATUS AND METHODS FOR AN OPTICAL COVER

(75) Inventor: Daniel D. Evans, Phoenix, AZ (US)

(73) Assignee: Scopecoat LLC, Norfolk, VA (US)

( * ) Notice: Subject to any disclaimer, the term of this patent is extended or adjusted under 35 U.S.C. 154(b) by 920 days.

This patent is subject to a terminal disclaimer.

(21) Appl. No.: 13/269,810

(22) Filed: Oct. 10, 2011

(65) Prior Publication Data

US 2012/0024732 A1 Feb. 2, 2012

Related U.S. Application Data

(63) Continuation of application No. 12/537,499, filed on Aug. 7, 2009, now Pat. No. 8,056,713.

(60) Provisional application No. 61/158,315, filed on Mar. 6, 2009.

(51) Int. Cl.
| | |
|---|---|
| *B65D 85/38* | (2006.01) |
| *A45C 11/08* | (2006.01) |
| *G02B 23/16* | (2006.01) |
| *A45F 3/00* | (2006.01) |
| *A45F 5/00* | (2006.01) |

(52) U.S. Cl.
CPC .............. *A45C 11/08* (2013.01); *G02B 23/16* (2013.01); *A45F 2003/002* (2013.01); *A45F 2005/006* (2013.01); *Y10T 29/49* (2015.01); *Y10T 29/49826* (2015.01)

(58) Field of Classification Search
CPC ... A45C 11/08; G02B 23/16; A45F 2003/002; A45F 2005/006; B65D 85/38
USPC ......... 206/316.3, 316.2, 316.1; 224/909, 908
See application file for complete search history.

(56) References Cited

U.S. PATENT DOCUMENTS

| | | | | | |
|---|---|---|---|---|---|
| 3,782,614 | A | * | 1/1974 | Campisi | 2/251 |
| 5,101,974 | A | * | 4/1992 | Alwitt | 206/316.2 |
| 6,095,328 | A | * | 8/2000 | Smithbaker et al. | 206/316.3 |
| D601,341 | S | * | 10/2009 | Arman | D3/267 |
| 8,132,669 | B1 | * | 3/2012 | Stubel | A45C 11/08 |
| | | | | | 206/316.3 |

* cited by examiner

*Primary Examiner* — J. Gregory Pickett
*Assistant Examiner* — Rafael Ortiz
(74) *Attorney, Agent, or Firm* — Shaddock Law Group, PC

(57) ABSTRACT

Apparatuses and methods for protecting an optical device generally comprise: a sleeve portion to circumscribe and substantially conform to the shape of at least a portion of a housing of the optical device, and a body portion detachably coupled to the sleeve portion, wherein the body portion comprises an elongated piece comprising at least a first flap at a first end to encase a first lens. The sleeve portion and the body portion comprise of an elastic material.

20 Claims, 3 Drawing Sheets

APPARATUS AND METHODS FOR AN OPTICAL COVER

CROSS-REFERENCE TO RELATED APPLICATION

This application is a continuation of U.S. patent application Ser. No. 12/537,499 titled "Apparatus and Methods for an Optical Cover", filed Aug. 7, 2009, which claims the benefit of U.S. Provisional Patent Application No. 61/158,315 filed Mar. 6, 2009, and incorporates the disclosure of each application by reference.

FIELD OF INVENTION

The present invention is directed generally towards protective covers for optics, and more particularly, representative and exemplary embodiments of the present invention generally relate to apparatuses and methods relating to elastic, substantially form fitting protective covers for binoculars.

SUMMARY OF THE INVENTION

In various representative embodiments, the present invention may comprise a form fitting first portion that circumscribes a portion of a housing for binoculars. Coupled to the first portion may be a second portion that has flaps at either one or both ends to cover the binocular eye viewing lenses and/or the image receiving lenses. The first and second portions may be manufactured from an elastic, form fitting material such as neoprene. For example, in an embodiment, a protective cover for an optical device may comprise: a sleeve portion to circumscribe and substantially conform to at least a portion of a housing of the optical device, and a body portion coupled to the sleeve portion, wherein the body portion comprises an elongated piece comprising at least a first flap at a first end to encase a first lens. In this example, the sleeve portion and the body portion comprise of an elastic material.

In an alternate representative embodiment, a protective cover for binoculars may comprise an elongated portion, wherein the elongated portion may comprise at least a first flap at a first end to fit over and surround a first set of lenses so as to protect the first set of lenses, and a coupling portion to couple the elongated portion to the binoculars. In an embodiment, the coupling portion may comprise a second flap at a second end, opposite the first end, to fit over and surround a second set of lenses so as to protect the second set of lenses. The protective cover may comprise an elastic material, such as a neoprene type material, such that either one, some, or all of the elongated portion, the first flap, and the second flap may be stretched to form fit over, along, and/or about their respective portions of the binoculars. In exemplary embodiments, the first set of lenses may comprise the image receiving lenses and the second set of lenses may comprise the eye viewing lenses, or vice versa.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

Methods and apparatus are shown and described for protective covers for optics. The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system. For example, the present invention may employ various formable, resilient materials, e.g., protective optical covers, and the like, which may carry out a variety of functions. In addition, the present invention may be practiced in conjunction with any number of optical applications, such as binoculars, and the system described is merely one exemplary application for the invention. Further, the present invention may employ any number of conventional techniques for partially covering an optical device during use, and fully covering an optical device for storage, non-use, and the like.

Various representative embodiments of the present invention may be applied to any apparatus, device, system, and or method for protecting an optical device. Certain representative embodiments may include, for example: a formable, elastic, environmental-resilient type material that may loop, enclose, fit, wrap around, circumscribe, and/or suitably couple to the optical device, particularly a housing and/or lenses of the optical device. It should be noted that the present invention may be used as a protective lens cover for a myriad of optical devices susceptible to dirt and/or damage such as, dust, fingerprints, scratches, cracks, chips, and the like. In particular, though, the present invention may be used to protect the lenses for a pair of binoculars.

Figure 1:
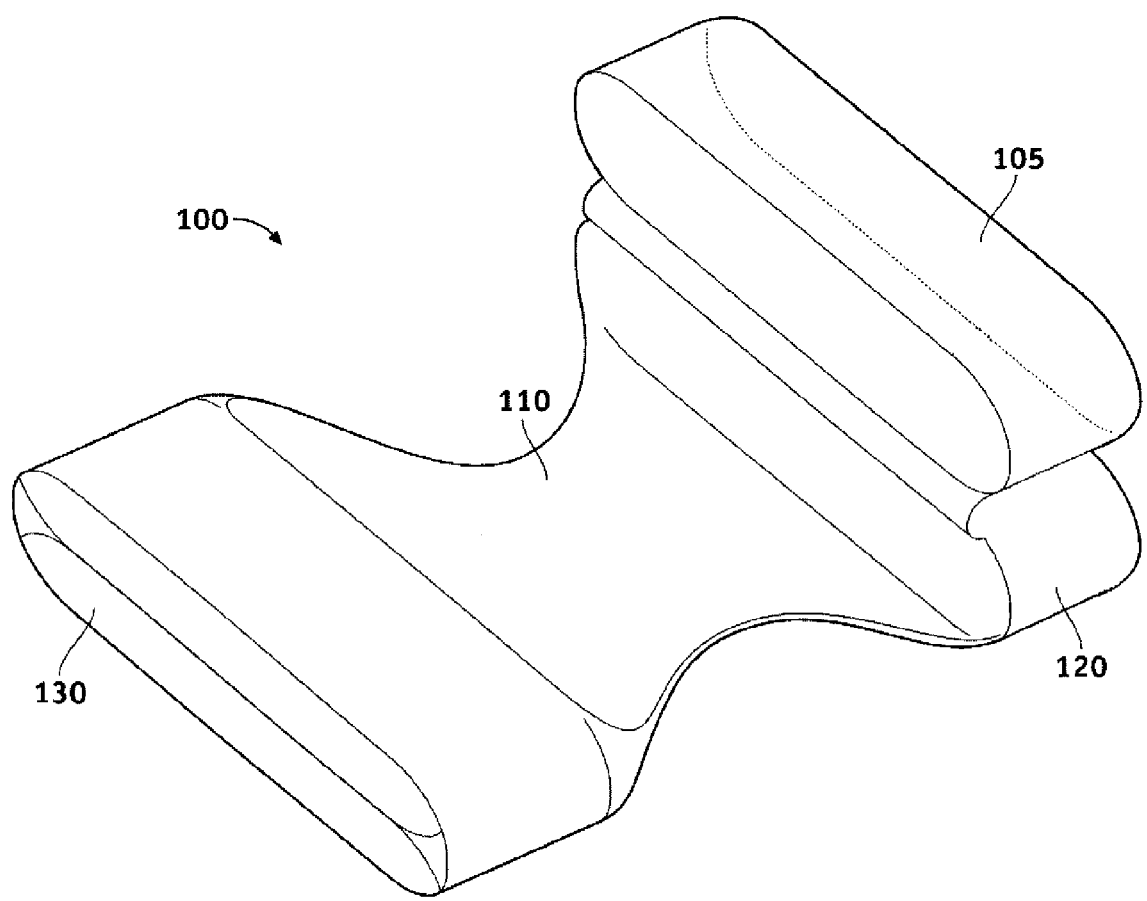
FIG. 1 representatively illustrates a perspective view of an exemplary embodiment of a protective cover for a pair of binoculars, in accordance with the present invention.
Figure 2:
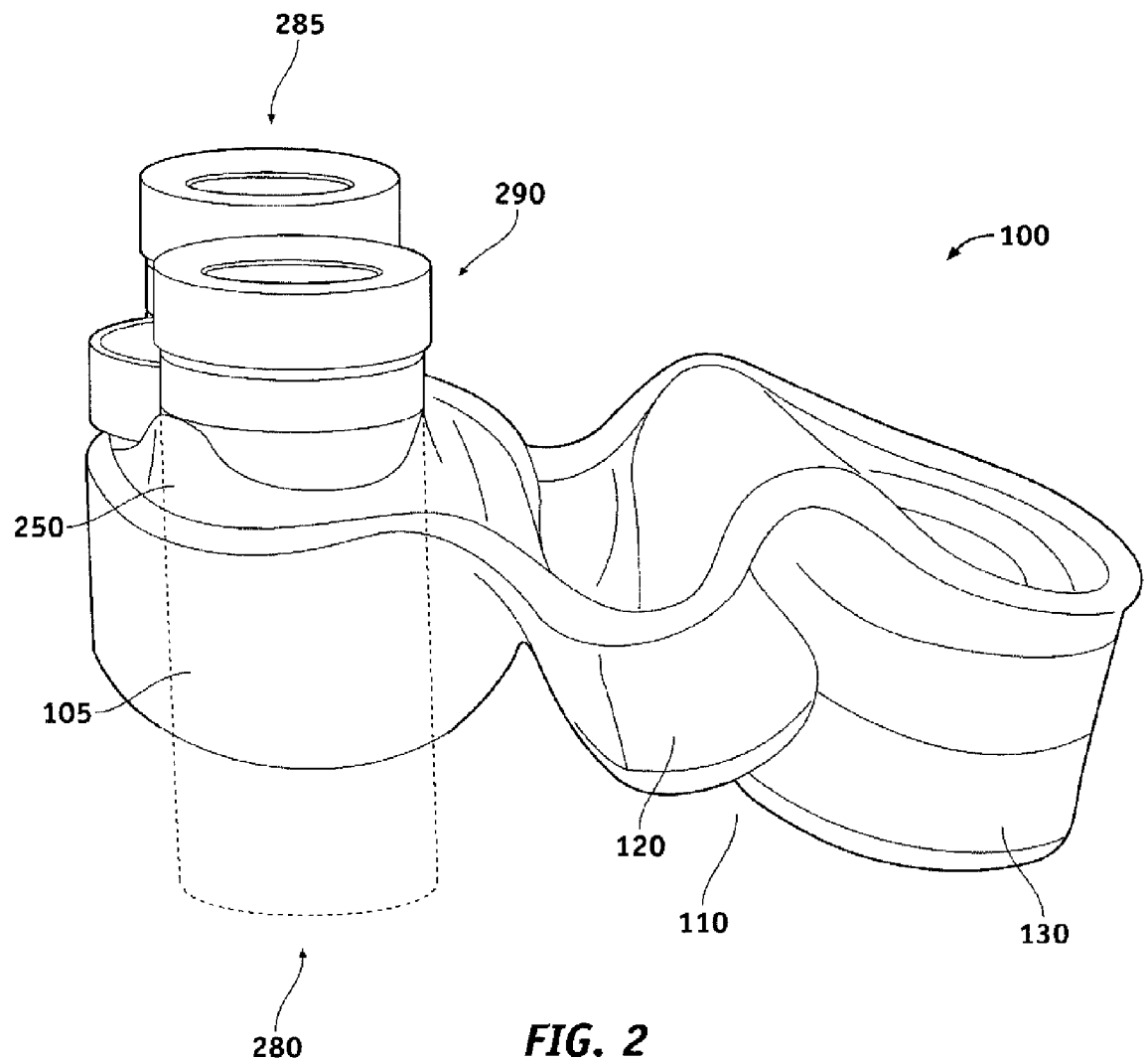
FIG. 2 representatively illustrates the protective cover in the open, lens unprotected position.
Figure 3:
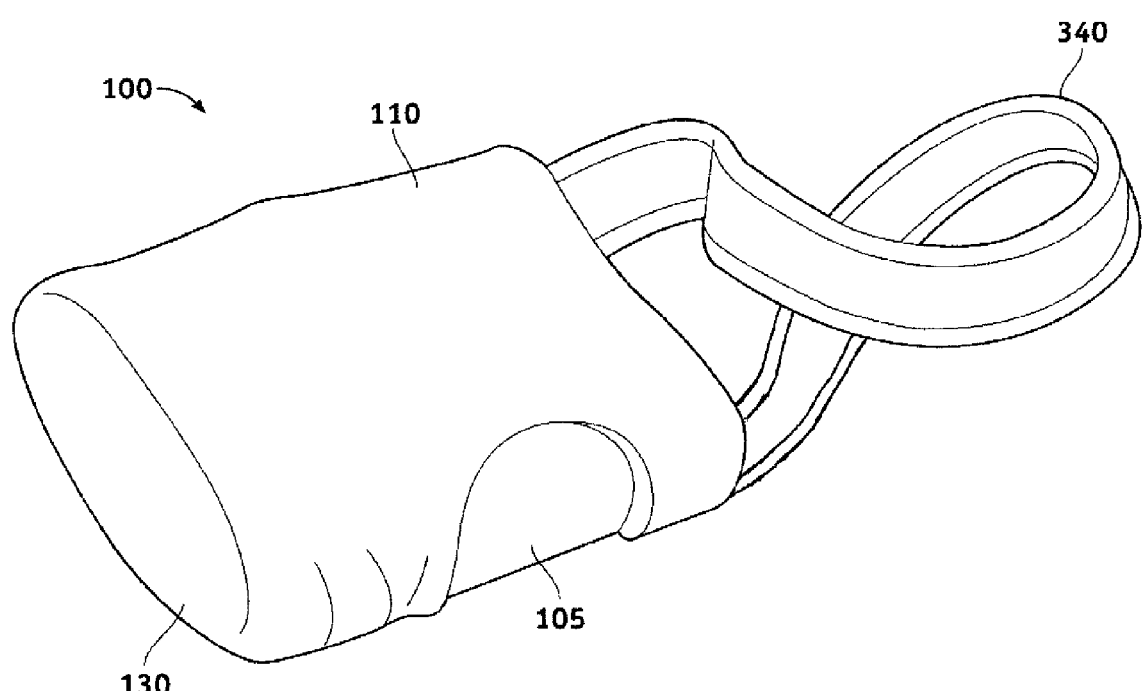
FIG. 3 representatively illustrates the protective cover in the closed, lens protected position.

In accordance with exemplary embodiments and referring to the various figures, FIGS. 1-3 show an exemplary optical cover 100 that may comprise a sleeve portion 105 and a body portion 110. The sleeve portion 105 may comprise a circumference that may be at least partially expanded to fit onto and to stretch around, i.e. circumscribe, a housing 250 (FIG. 2) of an optical device 290, such as the main housing body of binoculars. The sleeve portion 105 may comprise of an elastic, neoprene type material, such that when the housing 250 is surrounded by the sleeve portion 105, the elasticity of the sleeve portion 105 causes the sleeve portion 105 to fit substantially snugly to the housing 250 and substantially form fit to the contours of the housing 250. In this manner the sleeve portion 105 may provide protection for the housing 250 and thus, the optical device 290. The form fitting nature of the sleeve portion 105 may also allow a user the benefit of manipulating the optical device 290 by the original contours of the housing 250. In other words, the form fitting nature does not detract from the contours as the designers of the optical device 290 had originally intended. This provides a superior "feel" for the user as opposed to some other bulky body cover.

In accordance with exemplary embodiments, the sleeve portion 105 may comprise various characteristics, including widths, thicknesses, textures, circumferences, etc., depending on the preferences of the user, the make and/or model of the binoculars, the intent of a designer, etc. For example, some sleeve portions may comprise a larger circumference to accommodate various larger long range field binoculars, whereas a smaller circumference sleeve portion may accommodate smaller personal, short range binoculars.

In accordance with exemplary embodiments, the material used to comprise sleeve portion 105 may comprise various thicknesses to accommodate various design embodiments, and in some exemplary embodiments the thicknesses may range from about 2 mm to about 6 mm. The sleeve portion 105 may also comprise variable widths to also accommodate various design embodiments, wherein the widths may be designed to cover some or substantially the entire housing 250 of the optical device 290. In general, the housing 250 of the optical device 290, such as binoculars, extends between image receiving lenses 280 and eye lenses 285.

The sleeve portion 105 may also comprise textured portions (not shown) such that when positioned on the housing 250, the sleeve portion 105 may be situated with such textured portion positioned to align with the anticipated placement of a user's hands, thereby providing a more secure, slip-proof grip. In another embodiment, the sleeve portion 105 may comprise additional padding at a position to also align with the anticipated placement of the user's hands to provide additional comfort, for example during extended periods of use of the optical device 290.

In accordance with exemplary embodiments, the sleeve portion 105 may comprise various configurations. For example, as stated above, the sleeve portion 105 may comprise of an elastic, neoprene type material, and in one exemplary embodiment, a configuration may comprise a composite material comprising a first nylon layer coupled to a first side of a neoprene layer, and a second nylon layer coupled to a second side of the neoprene layer, wherein the neoprene layer may be positioned between the first nylon layer and the second nylon layer. However, the sleeve portion 105 is not limited in this regard and other design configurations may be employed. For example, although the sleeve portion 105 may preferably comprise a neoprene type material, the sleeve portion 105 may alternately or conjunctively comprise spandex, foam, lycra, foam, plastics, rubber, cotton, vinyl, and/or the like. Additionally, the sleeve portion 105 may comprise material that may be bendable, deformable, flexible, elastic, invertible, reversible, and/or the like. The sleeve portion 105 may generally comprise any material that inherently comprises some degree of elasticity to provide a secure fit when placed around the housing 250 of the optical device 290.

In accordance with exemplary embodiments, the sleeve portion 105 may be reinforced with one or more layers of material. In yet another embodiment, the sleeve portion 105 may comprise of a high-hardness material that may be placed at least partially within the sleeve portion 105, placed externally, and/or integrated into the sleeve portion 105 to provide extra reinforcement to the sleeve portion 105. In accordance with various embodiments, the sleeve portion 105 may comprise any suitable size and/or shape for securing the optical cover 100 to the optical device 290.

In accordance with exemplary embodiments, the sleeve portion 105 may also comprise various slits, slots, openings, tabs, and the like, so as to be able to access any optical device components that may otherwise be covered by the sleeve portion 105 when placed about the housing 250. For example, the sleeve portion 105 may comprise a slot so that a focusing knob may be accessed, or a slit may be available to access any strap connection points, etc.

In accordance with exemplary embodiments, the sleeve portion 105 may also provide certain environmental protective properties, such as heat and/or light reflective properties, heat-resistance, fire-resistance and/or substantially fireproof properties, water resistant and/or waterproof properties. Further, beneficial properties may comprise impact resistant materials, bullet-resistant materials, bulletproof materials, moisture absorbent materials, and the like.

In accordance with exemplary embodiments and as briefly described above, the sleeve portion 105 is generally configured to wrap around the housing 250 of the optical device 290, e.g., binoculars and to substantially conform to the contours of the housing 250 of the optical device 290. In some embodiments, though, the sleeve portion 105 may only partially wrap around the housing 250, or the sleeve portion 105 may couple to the optical device 290 in some other fashion or at some other location on the optical device 290. Because the sleeve portion 105 is generally a static element of the present invention, i.e., it is not continuously removed and replaced like the body portion 110, which will be described in greater detail below, the sleeve portion 105 may comprise any configuration to allow the body portion 110 to couple to the sleeve portion 105 such that the body portion 110 may be continuously removed and replaced as described.

Among various exemplary embodiments, the sleeve portion 105 may suitably couple to the body portion 110 such that when the body portion 110 is removed to expose the binocular lenses 280 and/or 285 for use, the body portion 110 can remain in close proximity, for example hang down, for replacement over the lenses 280 and/or 285 after such use. In this position, the housing 250 of the optical device 290 may be at least partially protected by the sleeve portion 105, and the ends of the device, for example the lenses 280 and/or 285 may still be accessible for use. By suitably coupling the sleeve portion 105 to the body portion 110, this configuration prevents the user from having to store the body portion 110 each time the user desires to use the optical device 290. FIGS. 1-2 show an exemplary embodiment of the body portion 110 suitably coupled to the sleeve portion 105. In some exemplary embodiments, the body portion 110 may be detachably coupled to the sleeve portion 105. In this manner, should the user wish to use the optical device 290 for an extended period of time or for other reasons, the body portion 110 can be stored, rather than remain hanging down. For example, the sleeve portion 105 may be detachably coupled to the body portion 110 by Velcro®, snaps, hooks, loops, buttons, buckles, magnets, etc.

In accordance with exemplary embodiments, the optical cover 100 may comprise the body portion 110. The body portion 110 may comprise at least one flap, such as first flap 120 to cover a lens portion of the optical device 290, such as eye lenses 285. In other embodiments, the body portion 110 may further comprise a second flap, such as second flap 130 to cover another lens portion of the optical device 290, such as image receiving lenses 280. FIG. 2 shows the optical cover 100 in an "open" or "uncovered" configuration, wherein the body portion 110 is removed to allow use of the optical device 290. FIG. 3 shows an exemplary embodiment, wherein the optical cover 100 is in a "closed" or "covered" configuration to provide full protection for the optical device 290.

In accordance with exemplary embodiments, the body portion 110, similar to the sleeve portion 105, may be at least partially expanded to stretch about and cover at least a portion of the housing 250 of the optical device 290 and/or cover the lenses 280 and/or 285. The body portion 110 may also comprise an elastic, neoprene type material, such that when a portion of the housing 250 and/or the lenses 280, 285 are surrounded by the body portion 110, the elasticity of the body portion 110 allows the body portion 110 to fit substantially snugly to the housing 250 and/or the lenses 280, 285, and substantially form fit to the contours of the housing 250 and/or the lenses 280, 285. In this manner the body portion 110 may provide protection for the housing 250, the lenses 280, 285, and thus, the optical device 290. The form fitting nature of the body portion 110 may also allow the user the benefit of manipulating the optical device 290 by the original contours of the housing 250.

In accordance with exemplary embodiments and similar to the sleeve portion 105, the body portion 110 may also comprise various characteristics, including variable widths, thicknesses, textures, circumferences, etc., depending on the preferences of the user, the make and/or model of the binoculars, the intent of a designer, etc. For example, some body portions may comprise larger or smaller designs to accommodate various binocular types and/or models.

In accordance with exemplary embodiments, the material that comprises the body portion 110 may comprise various thicknesses to accommodate various design embodiments, and in some exemplary embodiments the thicknesses range from about 2 mm to about 6 mm. The body portion 110 may also comprise variable widths and/or lengths to also accommodate various design embodiments, wherein the certain widths and/or lengths may be designed to cover some or substantially the entire housing 250 of the optical device 290.

The body portion 110, similar to the sleeve portion 105, may also comprise textured portions (not shown) such that when positioned on the housing 250, the body portion 110 may be situated with such textured portion positioned to align with the anticipated placement of the user's hands, thereby providing a more secure, slip-proof grip. In another embodiment, the body portion 110 may comprise additional padding for added comfort and/or protection.

In accordance with exemplary embodiments, the body portion 110, similar to the sleeve portion 105, may comprise various configurations. For example, as stated above, the body portion 110 may also comprise an elastic, neoprene type material, and in one exemplary embodiment, a configuration may comprise a composite material comprising a first nylon layer coupled to a neoprene layer, and a second nylon layer coupled to the neoprene layer, wherein the neoprene layer may be positioned between the first nylon layer and the second nylon layer. However, the body portion 110 is not limited in this regard and other design configurations may be employed. For example, in addition to comprising a neoprene type material the body portion 110 may comprise spandex, foam, lycra, foam, plastics, rubber, cotton, vinyl, and/or the like. The body portion 110 may also comprise material that may be bendable, deformable, flexible, elastic, invertible, reversible, and/or the like. The body portion 110, like the sleeve portion 105, may generally comprise any material that inherently comprises some degree of elasticity to provide a secure fit when placed around the housing 250 of the optical device 290.

In other embodiments, the body portion 110 may be reinforced with one or more layers of material. In yet another embodiment, the body portion 110 may comprise of a high-hardness material that may be placed at least partially within the body portion 110 placed externally, and/or integrated into the body portion 110 to provide extra reinforcement to the body portion 110. In accordance with various embodiments, the body portion 110 may comprise any suitable size and/or shape for securing the optical cover 100 to the optical device 290 and/or covering the housing 250 and/or lenses 280, 285.

In accordance with exemplary embodiments, the body portion 110, like the sleeve portion 105, may also comprise various slits, slots, openings, tabs, and the like, so as to be able to access any optical device components that may otherwise be covered by the body portion 110 when placed about the housing 250 and/or covering the lenses 280, 285. For example, the body portion 110 may comprise a slot so that a focusing knob may be accessed, or a slit may be available to access any strap connection points, etc.

In accordance with exemplary embodiments, body portion 110 may also provide certain environmental protective properties, such as heat and/or light reflective properties, heat-resistance, fire-resistance and/or substantially fireproof properties, water resistant and/or waterproof properties. Further, beneficial properties may comprise impact resistant materials, bullet-resistant materials, bullet-proof materials, moisture absorbent materials, and the like.

Also similar to the sleeve portion 105, in accordance with exemplary embodiments and as briefly described above, body portion 110 may be generally configured to wrap about the housing 250 of the optical device 290 and/or the lenses 280/285, and to substantially conform to the contours of the housing 250 of the optical device 290. In some embodiments, though, the body portion 110 may only partially wrap around the housing 250, or the body portion 110 may couple to the optical device 290 in some other fashion or at some other location on the optical device 290.

In accordance with exemplary embodiments, the body portion 110 and/or the sleeve portion 105 may comprise various other elements to provide additional benefits. For example, the body portion 110 and/or the sleeve portion 105 may comprise various types and configurations of flaps, outside pockets for items such as lens covers, wrist loops/straps, shoulder/neck straps, removable clips, attachment elements such as Velcro®, snap/clip fastener mechanisms, buckles, etc. For example, and with reference to FIG. 3, a neck strap 340 is shown.

In accordance with an exemplary embodiment of the present invention, a method for manufacturing an optical cover for an optical device, such as a pair of binoculars, may first comprise procuring a cover pattern, for example a binocular cover pattern, from a first sheet of protective cover material. For example, the procurement may come from a roll of protective cover material from which first sheets may be cut at regular intervals, or the first sheet may come from a stack of pre-cut protective cover material. In another example, first sheets may be sectioned from larger sheets, for example, a larger sheet may be cut into halves, fourths, eights, etc. In some embodiments, first sheets may be procured from outside vendors, third party suppliers, and the like, wherein the first sheets may be received pre-cut and ready for further processing, or first sheets may be semi-processed with additional processing necessary before further manufacturing can occur. In any event, procuring a first sheet of protective cover material may comprise any one of purchasing, selecting, bartering, consigning, and the like.

Among exemplary embodiments, wherein the cover pattern may be cut from the first sheet of protective cover material, the term cutting may encompass any physical mechanism that may substantially remove the cover pattern from the first sheet. For example, the first sheet of protective cover material may be cut by a sharp tool such as a knife, razor, scalpel, punch, and the like. In other embodiments though, any other mechanism, be it electrical, such as a laser, or chemical, such as acid erosion, and the like may be used to cut the cover pattern from the first sheet. In an exemplary embodiment, the cover pattern may be cut in a single contiguous piece from the first sheet, but in other embodiments, two or more pieces may be cut from the first sheet, which may then be subsequently coupled together to create the cover pattern. In some embodiments, the cutting may substantially provide the cover pattern for subsequent processing, or the cutting may produce a "rough" outline that may be later refined in the manufacturing method.

The method for manufacturing the optical cover may comprise manipulating the cover pattern to form a binocular cover, and then stitching the cover pattern together to retain the form of the binocular cover. To form the three dimensional binocular cover, once the cover pattern has been procured, the cover pattern may be manipulated, either manually, such as by hand, or automatically, such as by machine, to form the binocular cover. To retain and secure the shape of the binocular cover for use, the manipulated cover pattern may be stitched together. The stitching may be done manually, such as by hand, or automatically, such as by machine. In some embodiments the manipulation and stitching may be carried out substantially concurrently to form and secure portions of the binocular cover in a progressive fashion until the binocular cover is completed.

It should be noted that stitching the cover pattern together is merely one manner to retain and secure the shape of the binocular cover as it is manipulated into the intended form. It is intended that the term "stitching" comprises all forms of securing, such as those that may encompass adhesives, snaps, clips, buttons, hasps, hooks, loops, welds, and any other type of physical coupling, as well, as any chemical and/or electrical mechanisms. It is further intended that the "stitching" term is not limited to merely securing the cover pattern together to form the binocular cover, but any other pattern and the like described.

In accordance with an exemplary embodiment, the stitched together cover pattern may comprise an elongated body portion comprising of a first lens flap positioned at an anterior portion and a second lens flap positioned at a posterior portion, wherein the first lens flap fits over corresponding anterior portion lenses of the optical device and the second lens flap fits over corresponding posterior portion lenses of the optical device, i.e., binoculars. As shown in the various FIGS. 1-3, the binocular cover, i.e. body portion 110, may comprise of an elastic neoprene material, which stretches over image receiving lenses and eye lenses, for example eye lenses 285 and image receiving lenses 280 as shown in the FIG. 2.

In accordance with an exemplary embodiment of the invention, the method for manufacturing the optical cover may further comprise, procuring a second sheet of protective cover material; cutting a sleeve pattern from the second sheet of protective cover material; manipulating the sleeve pattern to form a sleeve and stitching the sleeve pattern together to retain and secure the form of the sleeve. In one embodiment, the stitched together sleeve may comprise a band-like structure that may circumscribe a housing of the binoculars and due to the elasticity of the material, the sleeve may substantially conform to a shape or contours of the housing of the binoculars. It should be noted that the procuring, cutting, manipulating and/or stitching terms are similar to such terms described with respect to the binocular cover.

The method for manufacturing the optical cover may further comprise stitching the sleeve to the binocular cover, and in some embodiments the binocular cover may be detachably coupled to the sleeve. In accordance with an exemplary embodiment, the method for manufacturing the optical cover may also comprise affixing an accessory to at least one of the sleeve and/or the binocular cover comprising at least one of an external pocket, a wrist strap, a neck strap, a shoulder strap, a handle, a grip pad, a reflector, a clip, a fastener, etc.

In accordance with an exemplary embodiment, the method for manufacturing the optical cover may comprise the first sheet of protective cover material and/or the second sheet of protective cover material to comprise a neoprene material, and more specifically, a textured neoprene material.

In accordance with an exemplary embodiment of the present invention, it should be noted that the methods described for manufacturing the optical cover for a pair of binoculars is not mutually exclusive from any other methods associated with optical covers. Other complimentary and/or supplementary methods may be employed. For example, along with methods for manufacturing the optical cover, other methods may comprise: printing instructions to detail how to use the optical cover, packaging the optical cover, and/or marketing the optical cover.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments: however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A cover for an optical device having an eye piece and an image receiving lens, comprising:
    a first portion configured to attach to the optical device; and
    a second portion comprising:
        a first lens cover coupled to the first portion at a first end of the second portion; and
        a second lens cover coupled to the first lens cover,
        wherein the second portion is coupled to the first portion only at the first end of the second portion.

2. The cover according to claim 1, wherein at least one of the first portion and the first lens cover and the second lens cover comprises an elastic material.

3. The cover according to claim 1, wherein the cover is configured to be in a closed position comprising the first lens cover encasing either the eye piece or the image receiving lens and the second lens cover encasing the other of the eye piece or the image receiving lens of the optical device.

4. The cover according to claim 1, wherein the first lens cover is configured to encase at least one of an eye piece of the optical device and an image receiving lens of the optical device.

5. The cover according to claim 1, wherein the second lens cover is configured to encase at least one of an eye piece of the optical device and an image receiving lens of the optical device.

6. The cover according to claim 1, wherein the cover is configured to move to one of an open position configured to expose of the optical device and a closed position configured to encase of the optical device.

7. The cover according to claim 1, wherein the optical device is a pair of binoculars.

8. The cover according to claim 1, wherein the cover comprises neoprene.

9. The cover according to claim 1, wherein the first portion is at least one of flexible and expandable.

10. A protective cover for a pair of binoculars having a housing portion, a first pair of lenses, and a second pair of lenses comprising:
    a first portion comprising a sleeve adapted to circumscribe the housing portion of the pair of binoculars and substantially conforms to a shape of the housing portion, wherein the sleeve comprises two open ends; and
    a second portion, comprising:
        a first end coupled to the first portion and configured to encase the first pair of lenses; and
        a second end coupled to the first end and configured to encase the second pair of lenses,
        wherein the second portion is attached to the first portion only at the first end.

11. The protective cover according to claim 10, wherein:
    the first portion and the second portion comprise a first nylon layer coupled to a neoprene layer, and a second nylon layer coupled to the neoprene layer; and
    the neoprene layer is positioned between the first nylon layer and the second nylon layer.

12. The protective cover according to claim 10, further comprising an accessory coupled to at least one of the first portion and the second portion, wherein the accessory includes at least one of an external pocket, a wrist strap, a neck strap, a shoulder strap, a handle, a grip pad, a reflector, a clip, and a fastener.

13. The protective cover according to claim 10, wherein at least one of the first portion and the second portion comprises at least one of a compressible, moldable, formable, heat-resistant, fire-resistant, fire-proof, water-resistant, water-proof, bullet-proof and elastic material.

14. A protective cover for an optical device having a housing, a first lens, and a second lens, comprising:
    an expandable cylinder having open ends configured to circumscribe and substantially conform to at least a portion of the housing of the optical device; and
    a body comprising:
        a first end coupled to the cylinder and configured to encase the first lens of the optical device, and
        a second end coupled to the first end and configured to encase the second lens of the optical device,
        wherein the body is coupled to the cylinder only at the first end.

15. The protective cover according to claim 14, wherein the cylinder and the body comprise a neoprene material.

16. The protective cover according to claim 14, wherein the cylinder and the body comprise a first nylon layer coupled to a top surface of a neoprene layer, and a second nylon layer coupled to a bottom surface of the neoprene layer.

17. The protective cover according to claim 14, wherein at least one of the cylinder and the body has a thickness from about 2 mm to about 6 mm.

18. The protective cover according to claim 14, wherein the body is detachably coupled to the cylinder.

19. The protective cover according to claim 14, wherein the optical device comprises binoculars.

20. The protective cover according to claim 14, wherein the body is configured to disengage from the first lens and the second lens.

* * * * *